(12) United States Patent
D'Evelyn et al.

(10) Patent No.: US 7,101,433 B2
(45) Date of Patent: Sep. 5, 2006

(54) HIGH PRESSURE/HIGH TEMPERATURE APPARATUS WITH IMPROVED TEMPERATURE CONTROL FOR CRYSTAL GROWTH

(75) Inventors: Mark P. D'Evelyn, Niskayuna, NY (US); Robert V. Leonelli, Jr., Solon, OH (US); Peter S. Allison, Conroe, TX (US); Kristi J. Narang, Voorheesville, NY (US); Robert A. Giddings, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 304 days.

(21) Appl. No.: 10/699,504

(22) Filed: Oct. 31, 2003

(65) Prior Publication Data

US 2004/0134415 A1 Jul. 15, 2004

Related U.S. Application Data

(60) Provisional application No. 60/435,189, filed on Dec. 18, 2002.

(51) Int. Cl.
*C30B 29/40* (2006.01)

(52) U.S. Cl. ............... 117/69; 117/68; 117/201; 117/929; 423/446

(58) Field of Classification Search ........... 117/68, 117/69, 929, 201; 423/446
See application file for complete search history.

(56) References Cited

U.S. PATENT DOCUMENTS

| | | | | |
|---|---|---|---|---|
| 2,941,241 A | 6/1960 | Strong | | 425/77 |
| 4,523,478 A | 6/1985 | Zacharias | | 73/861 |
| 4,910,403 A * | 3/1990 | Kilham et al. | | 250/343 |
| 5,236,674 A | 8/1993 | Frushour | | 422/241 |
| 6,273,948 B1 | 8/2001 | Porowski et al. | | 177/77 |
| 6,285,010 B1 * | 9/2001 | Fujikawa et al. | | 219/411 |
| 6,375,446 B1 | 4/2002 | Leonelli | | 425/77 |
| 2003/0140845 A1 | 7/2003 | D'Evelyn et al. | | 117/8 |

FOREIGN PATENT DOCUMENTS

| | | |
|---|---|---|
| EP | 0152726 | 8/1985 |
| EP | 0157393 | 10/1985 |
| EP | 0220462 | 5/1987 |
| FR | 1306951 | 10/1962 |
| GB | 922619 | 4/1963 |
| WO | WO 01/36080 | 5/2001 |

OTHER PUBLICATIONS

Hanser A D, et al: "Growth, doping and characterization of epitaxial thin films and patterened structures of AlN, GaN, and AlxGa1-xN"; XP004364890.

Lawniczak-Jablonska K. et al.: "Polarization dependent x-ray absorption studies of the chemical bonds anisotropy in wurtzite GaN grown at different conditions"; XP004304294.

* cited by examiner

Primary Examiner—Robert Kunemund (57) ABSTRACT

A high temperature/high pressure (HP/HT) apparatus for converting feedstock housed in a capsule into product crystals, comprising at least two electrical heating paths for independent control of both the mean temperature in the reaction cell and the temperature gradient across the reaction cell.

27 Claims, 7 Drawing Sheets

HIGH PRESSURE/HIGH TEMPERATURE APPARATUS WITH IMPROVED TEMPERATURE CONTROL FOR CRYSTAL GROWTH

CROSS-REFERENCE TO RELATED APPLICATIONS

This invention claims priority to U.S. Provisional Patent Application No. 60/435,189 having a filing date of Dec. 18, 2002.

FIELD OF THE INVENTION

The present invention generally relates to high pressure/high temperature (HP/HT) apparatuses for use in growing semiconductor crystals and methods thereof, and more particularly to HP/HT apparatuses and methods with the ability to independently control both the mean temperature and the temperature gradient.

BACKGROUND OF THE INVENTION

Conventional high pressure/high temperature (HP/HT) apparatuses are known in the art, for use in the preparation of crystals such as diamond, cubic boron nitride (CBN), hexagonal boron nitride (HBN), semiconductor crystals such as gallium nitride (GaN) crystals and the like, as disclosed in U.S. patent application Publication No. 2003/0140845.

HP/HT apparatuses comprising a vessel or cell assembly may be of the belt-type, die-type, belt/dye type, or a zero-stroke type, are described, for example, in U.S. Pat. Nos.; 2,941,241; 4,523,478; 6,375,446; the disclosures of which are incorporated herein by reference. It is not uncommon for these types of HP apparatuses to contain up to 800,000–1,000,000 psi and to go up in temperatures of 2,000° C. and more.

The growth of large single crystals in such HP/HT apparatuses normally is carried out with a temperature gradient. The solubility of the substance to be crystallized is greater at one end of the cell than the other, allowing for dissolution of "source" or "nutrient" material at one end, transport (e.g., by diffusion) to the other end, and epitaxial deposition onto one or more growing crystals. The supersaturation and growth rate are controlled by the magnitude of the temperature gradient. The temperature gradient normally is achieved by means that do not allow for adjustment during the run, e.g., the growth region is asymmetrically placed within the cell so that one end is hotter than the other.

In the cell of a typical HP/HT apparatus in the prior art, a heating element makes electrical contact with two points of the apparatus, for example, with the top and the bottom anvils, and the cell is heated by passing electrical current through the heating element. External components of the pressure vessel are cooled, typically by forced convection with a coolant such as water or a water/anti-freeze solution. The mean cell temperature increases as an increasing electrical current is passed through the heating element. However, the hot end of the cell is hotter than the cold end at all times during the run, typically by an amount that is approximately proportional to the mean temperature increase of the cell relative to its initial value. Because the cell contains only one independent heating circuit and cooling is provided at a fixed temperature, it is not possible to independently control the temperatures of two different regions of the sample or locations within the cell.

For growing crystals or processing materials at modest pressures, U.S. Pat. No. 6,273,948 by Porowski et al. discloses a three-zone/independently-heated furnace for crystal growth in a gas-pressure vessel at pressures up to 20 kbar. However, gas-pressure vessels have significant limitations for crystal growth and material processing under extreme conditions. First, the volumes and pressures achievable with gas-pressure vessels are limited. Large-volume gas-pressure vessels are normally limited to a maximum working pressure of about 2 kbar. Small-volume internally-heated pressure vessels are commercially available at pressures up to about 10 kbar. Second, gas-pressure vessels are hazardous, particularly when working at pressures above 5 kbar.

By contrast, HP/HT apparatuses that utilize a solid or a liquid as a pressure medium, which are significantly less hazardous than gas-pressure vessels, can access considerably higher pressures, to 100 kbar and above. However, there is still a need for in the art for independently controlling the temperature of at least two different regions in these HP/HT apparatuses for growing crystals or processing materials with a solid or liquid pressure medium at pressures between about 2 kbar and about 100 kbar, or more particularly at pressures between about 5 kbar and about 80 kbar.

The applicants have built a surprisingly simple and novel HP/HT apparatus that allows the operator to independently control both the mean temperature in the cell and the temperature gradient across the cell. In one embodiment of the invention, improved crystal growth is also obtained in the novel apparatus of the invention.

BRIEF SUMMARY OF THE INVENTION

The invention relates to single crystals larger than about 2 mm in diameter, substantially free of tilt boundaries, with a dislocation density less than about $10^4$ $cm^2$, grown by a temperature-gradient recrystallization process at high pressure/high temperature, in which the temperature gradient between a seed crystal and source material is temporally varying so as to produce an increasing growth rate during at least a portion of the growing process.

The invention further relates to a high temperature/high pressure (HP/HT) process to convert feedstock housed in a capsule into product crystals by establishing an electrical heating path between a lateral confining die and upper and lower pressure anvils, comprising electrical heating paths enabling the temperatures of the upper and lower capsule zones to be independently controlled.

DETAILED DESCRIPTION OF THE INVENTION

In the following description, like reference characters designate like or corresponding parts throughout the several views shown in the figures. It is also understood that terms such as "top," "bottom," "outward," "inward," and the like are words of convenience and are not to be construed as limiting terms. It should be noted that the illustrations herein are for the purpose of describing embodiments of the invention and are not intended to limit the invention thereto.

General description of HP/HT process: HP/HT apparatus refers to an apparatus for processing materials at elevated pressures and temperatures, for example at pressures between about 1 bar and about 100 kbar. In one embodiment, the HP/HT apparatus or pressure vessel is used for processing at least one material in a supercritical fluid, wherein a sealed, self-pressurizing capsule for containing the at least one material and a solvent is disposed within the cell in the vessel. The solvent becomes a supercritical fluid at high temperature and high pressure. HP/HT conditions encompass temperatures greater than about 100° C. and pressures greater than about 1 atm. A pressure transmission medium disposed in the cell surrounds the self-pressurizing capsule and maintains an outer pressure on the self-pressurizing capsule to prevent the self-pressurizing capsule from rupturing or bursting.

In another embodiment, the high pressure necessary for processing the at least one material is generated within the self-pressurizing capsule itself, rather than the necessary pressure being externally applied to the capsule. As the capsule is heated, the vapor pressure of the solvent increases. The vapor pressure of the solvent at a given temperature and quantity of solvent present (also known as "percent fill") within the capsule can be determined from the phase diagram of the solvent. At a sufficiently high temperature and pressure, the solvent becomes a supercritical fluid. As the internal pressure within the self-pressurizing capsule increases, the walls of the self-pressurizing capsule deform outward and press against pressure transmission medium.

In yet another embodiment, the pressure transmission medium is thermally stable up to the temperature at which the at least one material is to be processed in a supercritical fluid. That is, the pressure transmission medium does not decompose or react with the other components of pressure vessel, or undergo a solid state phase transition. The pressure-transmission medium can be in either solid or liquid form.

In one embodiment of the HP/HT process, the pressure transmission medium remains a solid at the processing temperature, e.g., up to about 1300° C., and has a relatively low shear strength and internal friction. In another embodiment, the pressure transmission medium, when placed in the cell of pressure vessel, is compacted to greater than about 85% of its theoretical density in order to avoid introducing excess porosity into the cell. In one embodiment, the pressure transmission medium comprises at least one alkali halide, such as NaCl, NaBr, or NaF. In another embodiment, the pressure transmission medium may comprise at least one of talc, pyrophyllite, molybdenum disulfide, graphite, hexagonal boron nitride, silver chloride, calcium fluoride, strontium fluoride, calcium carbonate, magnesium oxide, zirconium oxide, merylinite clay, bentonite clays, and sodium silicate.

Figure 1:
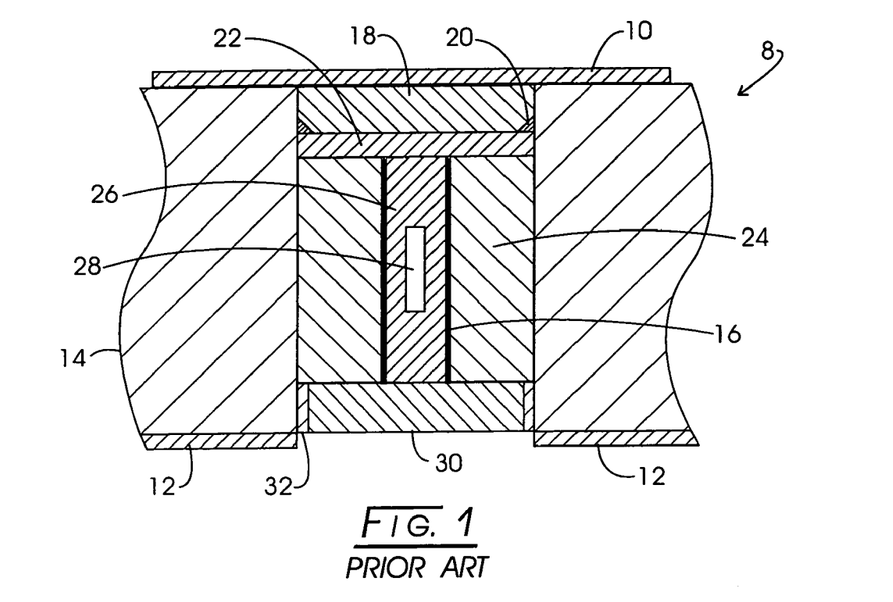
FIG. 1 is a cross-sectional view of the cell within a first prior art zero-stroke-type pressure apparatus.
Figure 2:
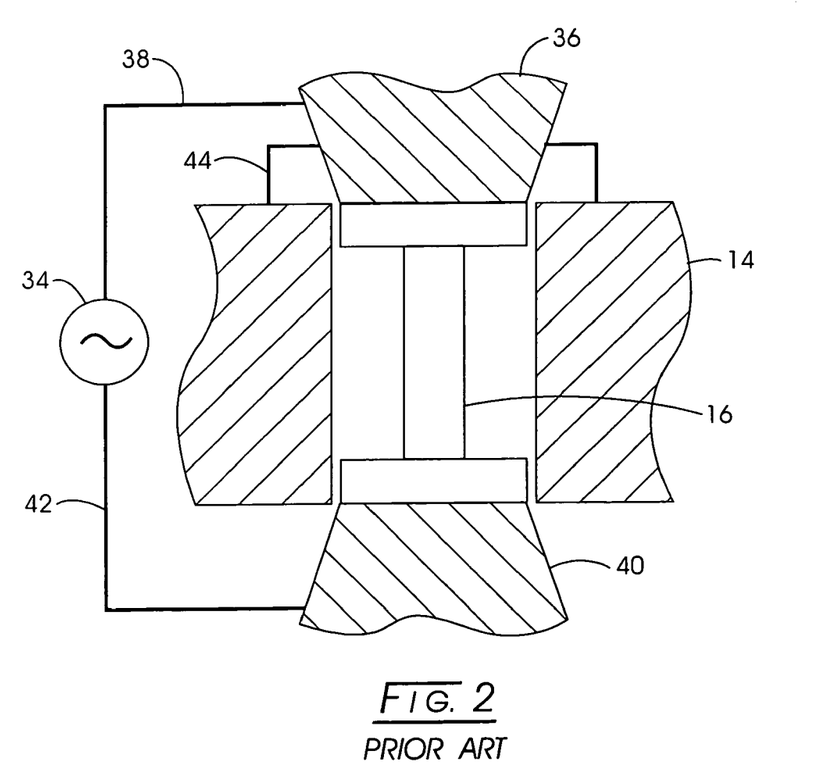
FIG. 2 shows the electrical path for the zero-stroke-type apparatus of FIG. 1 for its heating.

Prior art HP/HT apparatus: The prior art pressure vessel is first described for comparative purposes. FIGS. 1 and 2 illustrate a prior art zero-stroke-type pressure apparatus, 8. The performance of an HP/HT apparatus may be characterized by its pressure response, which is defined as the percent increase in cell pressure divided by the percent increase in press force that produces the increased cell pressure, relative to a reference operating condition. As known in the art, a zero stroke apparatus is one in which the pressure response is below 0.2, and, more preferably below, 0.05. A zero stroke apparatus is typically easier to control in supercritical-fluid-processing applications than other apparatuses, and is able to capture or contain the pressure generated within the capsule with little or no tendency to crush it. Although some stroking (e.g., an increase or decrease in the separation between the punches or anvils) may occur during operation, the extent of stroking is much smaller than in other designs.

The zero-stroke apparatus comprises upper copper disk, 10, and a lower insulating gasket, 12, which surmount a die, 14. Intermediately disposed is an upper steel endcap, 18, juxtaposed against a lower annular brass ring, 20. Below endcap 18 is a graphite disk, 22, which sits atop an annular salt bushing, 24, which surrounds within its annulus a cylindrical heating element, 16, and a solid or liquid pressure transmission medium, 26, referred as "salt," for example, a solid pressure transmission medium comprising sodium chloride salt. The heating element may be formed from, for example, at least one of GRAFOIL® graphite foil, graphite, NICHROME alloy (Ni 60%, Fe 25%, Cr 15%), niobium, titanium, tantalum, stainless steel, nickel, chromium, zirconium, molybdenum, tungsten, rhenium, hafnium, platinum, silicon carbide, and combinations thereof. Contained within salt 26 is a sample or a capsule, 28, for containing the ingredients (sample) convertible by HP/HT into crystals, for example, diamond, cubic boron nitride, gallium nitride, and the like. Disposed below salt 26 and salt bushing 24 is a lower steel endcap, 30, which is surrounded by an annular pyrophyllite bushing, 32.

FIG. 2 illustrates the electrical path for heating prior art apparatus 8. In the figure, a current source, 34, is seen connected to an upper punch (or anvil), 36, by a line, 38, and to a lower punch (or anvil), 40, by a second electrical line, 42, for their heating. Upper punch 36 also is in electrical contact with die 14, represented schematically by line, 44. Current passes from top anvil 36, through the top endcap 18 (FIG. 1) and graphite disk 22 (FIG. 1), through the heating element 16, though the bottom endcap 30 (FIG. 1) and bottom anvil 40. As only one independent heating circuit is provided in this design, it is not possible to independently control the temperatures of the top and bottom of sample 28.

The present invention relates to a novel and surprisingly simple HP/HT apparatus comprising a cell for growing crystals (or processing material) in a liquid or solid pressure transmitting medium, with at least one electrical insulator in the apparatus for establishing at least two different electrical heating paths in a heating element and a power system, for independently controlling the temperatures of at least two locations in the cell, wherein the temperature gradient between the seed crystal and the source material is temporally varying so as to produce an increasing growth rate during at least a portion of the growing process.

Figure 3:
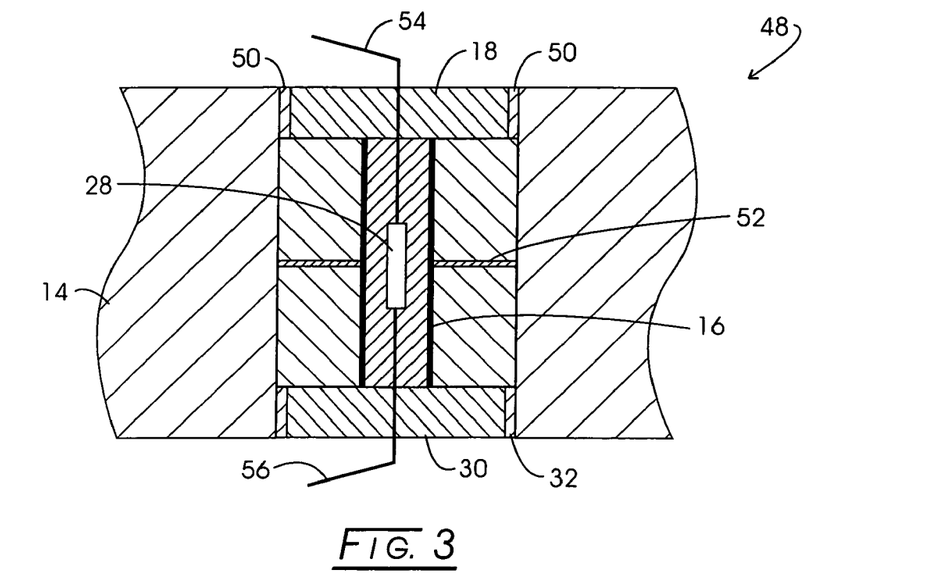
FIG. 3 is a cross-sectional view of one embodiment of the invention, a zero-stroke-type apparatus.

HP/HT Apparatus Having Dual/Multi-Heating Paths. A first embodiment of the novel apparatus of the invention that allows the operator to independently control both the mean temperature in the cell and the temperature gradient across the cell is shown in FIG. 3, for a zero-stroke-type apparatus, 48.

Like components of apparatus 8 are shown similarly numbered for apparatus 48, it will be observed that upper steel endcap 18 has been surrounded by an annular pyrophyllite bushing, 50, which along with annular pyrophyllite bushing 32, electrically insulates anvils 36 and 40 from die 14. An electrically conductive annulus, 52, is interposed about midway between the top and bottom of heater or heating element 16 in order to divide the reaction cell into an upper section and a lower section. Heating element 16 may be in the form of a heating tube, or a heated foil, ribbon, bar, wire, ring, or combinations thereof. The heating element 16 may comprise at least one of graphite foil, graphite, nichrome, niobium, titanium, tantalum, stainless steel, nickel, chromium, zirconium, molybdenum, tungsten, rhenium, hafnium, platinum, silicon carbide, and combinations thereof. In one embodiment, the heating element 16 may have a non-uniform resistivity along its length to provide a temperature gradient. Non-uniform resistivity may be provided, for example, by providing at the heating element 16 having a non-uniform thickness, by perforating the at least one heating element at selected points, or by providing at least one heating element 16 that comprises a laminate of at least two materials of differing resistivity at selected points along the length of the at least one heating element 16.

Annulus 52 makes contact with heating element 16 along its inner diameter and with die 14 along its outer diameter. Annulus 52 may be formed from, for example, at least one of GRAFOIL® graphite foil, graphite, NICHROME alloy (Ni 60%, Fe 25%, Cr 15)%, niobium, titanium, tantalum, stainless steel, nickel, chromium, zirconium, molybdenum, tungsten, rhenium, hafnium, platinum, silicon carbide, and alloys and combinations thereof.

Figure 4:
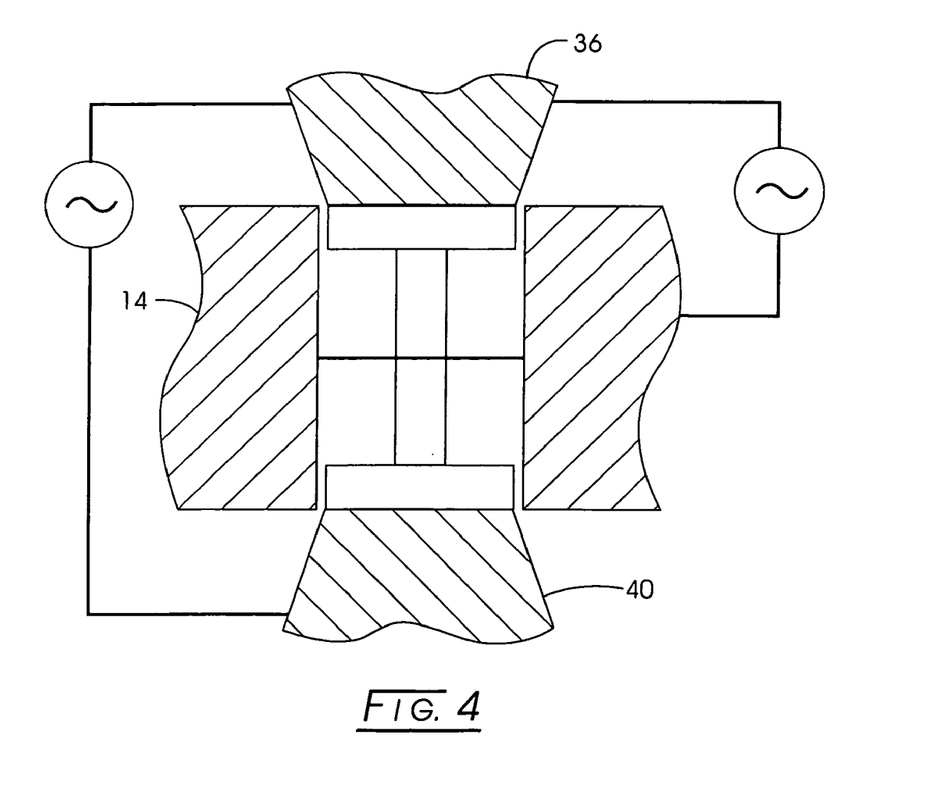
FIG. 4 shows the electrical path for the inventive zero-stroke-type apparatus of FIG. 3 for its heating.

The main heater power is applied between anvils 36 and 40, and differential heater power is applied between die 14 and either anvil 36 or anvil 40, as shown in FIG. 4. Alternatively, one heater circuit can be applied between die 14 and anvil 36, and the second circuit between die 14 and anvil 40. To monitor or control the temperature at two positions within the cell, for example, at the top and bottom of the sample, temperature sensors, 54 and 56, are inserted through cell components to the desired position. In one embodiment of the invention, temperature sensors are in the form of thermocouples, thermistor, an optical fiber coupled to an optical pyrometer, or any combination thereof.

The capsule 28 is self-pressurizable up to between 1 atm (~1 bar) and about 80 kbar. In one embodiment, capsule 28 is pressurizable up to between about 5 kbar and about 80 kbar. The capsule 28 is typically formed from a malleable metal such as, but not limited to, copper, silver, gold, platinum, stainless steel or the like. In another embodiment, the capsule 28 has a low hydrogen permeability and is chemically inert with respect to the supercritical fluid and the material to be processed within the capsule 28.

With minor adaptations, the above embodiment of the invention can be applied to a belt apparatus, a piston-cylinder apparatus, a multi-anvil press apparatus, or a split-sphere apparatus for growth of diamond or cubic boron nitride, or to grow or process other materials at HP/HT.

In one embodiment of a belt apparatus, the HP/HT cell configuration would be very similar to that shown in FIG. 3, but the anvils and die would be tapered rather than making contact along a plane as in the zero-stroke apparatus. In a piston-cylinder apparatus, at least one anvil typically is in electrical contact with the die, but each element can be separated electrically by means of insulating sleeves and gaskets, analogous to the configuration in FIG. 3.

Figure 5:
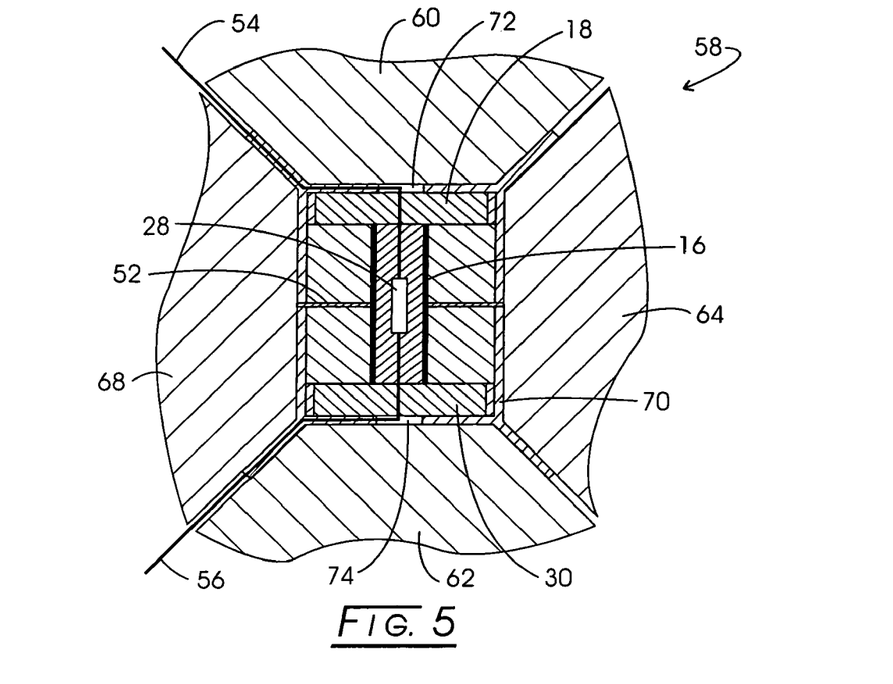
FIG. 5 is a cross-sectional view of another embodiment of the invention, a multi-anvil-type pressure apparatus.

Application of the present invention to a multi-anvil press apparatus, 58, is shown in FIG. 5. Most of the cell configuration is very similar to that shown in FIG. 3. However, the cell is confined by four or more anvils, 60, 62, 64, and 68, rather than by a die and two anvils. The cell proper is separated from the anvils and the anvils are separated from one another by at least one electrically-insulating gasket, 70. In one embodiment, the insulating gasket comprises at least one of natural or synthetic rubber, Mylar® (polyester film), polyimide, Teflon® (fluorocarbon polymer, tetrafluoroethylene fluorocarbons, fluorinated ethylene-propylene, and the like), pyrophyllite, talc, olivine, magnesium oxide, calcium carbonate, calcium oxide, strontium oxide, barium oxide, textilite and similar glued paper composites, merylinite clay, bentonite clay, sodium silicate, and hexagonal boron nitride.

Electrical contact between each end of heater 16 is made to separate anvils by means of a top and a bottom electrically-conductive insert, 72 and 74, respectively, in gasket or liner 70. The non-insulating, or electrically conductive gasket inserts 72 and 74, in one embodiment, comprise materials known in the art, e.g., at least one of copper, brass, molybdenum, graphite, nickel, cobalt, iron, stainless steel, or combinations thereof.

Figure 6:
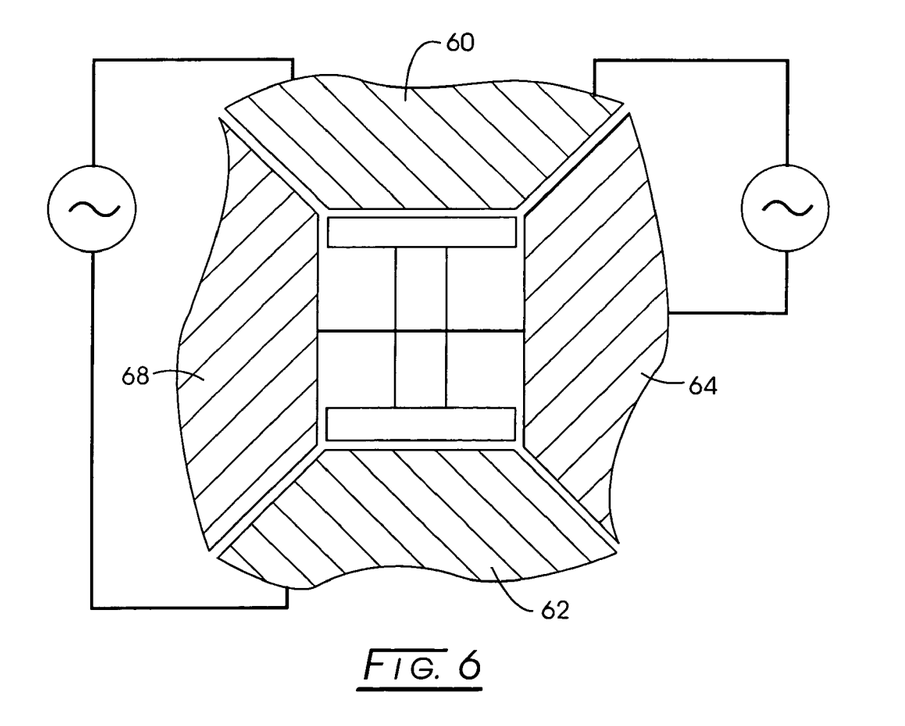
FIG. 6 shows the electrical path for the inventive multi-anvil-type apparatus of FIG. 5 for its heating.

An additional contact between the central portion of heater 16 and one or more anvils is made by means of a liner or annulus, 52 The main heater power is applied between anvils 36 and 40, and differential heater power is applied between anvil 14 and either anvil 60 or 62, as shown in FIG. 6.

In a split-sphere apparatus, the cell is contained within multiple anvils within opposing hemispherical cavities, which are pressurized during operation. The cell configuration is very similar to that shown in FIG. 5.

Figure 7:
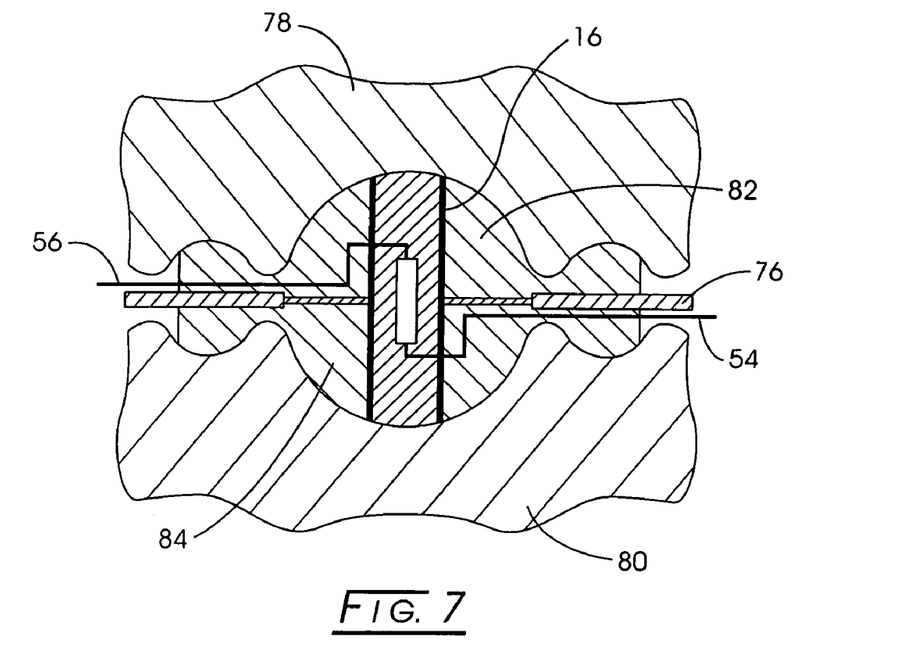
FIG. 7 is a cross-sectional view of one embodiment of the invention, a toroid (recessed anvil) type pressure apparatus.
Figure 8:
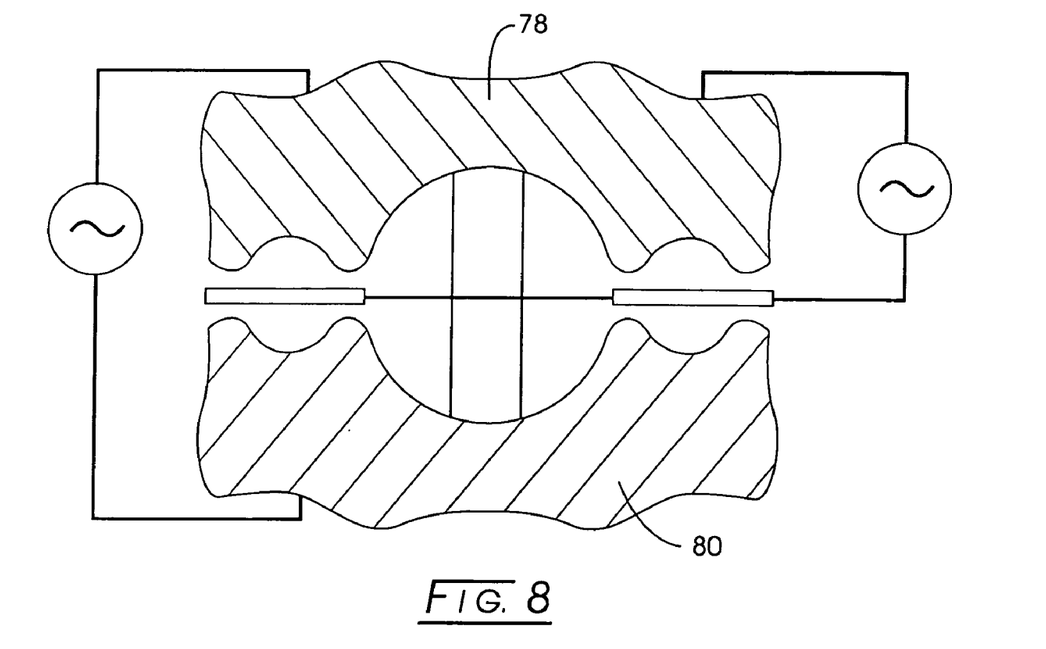
FIG. 8 shows the electrical path for the inventive toroid-type apparatus of FIG. 7 for its heating.

This concept also can be used with recessed-anvil apparatus, such as the toroid and related configurations, as shown in FIG. 7. Rather than having a single heating element in contact with the top and bottom anvils at the top and bottom ends, respectively, a disk or die, 76, is positioned between the two anvils, 78 and 80, separated from each by electrically-insulating gaskets, 82 and 84, and placed in electrical contact with a central portion of heating element 16. The main heater power is applied between anvils 78 and 80, and differential heater power is applied between disk 76 and either anvil 78 or 80, as shown in FIG. 8.

In another embodiment of the invention, which can be used with a belt-type apparatus, a zero-stroke apparatus, a multi-anvil press apparatus, or a toroid-type apparatus, at least one of the punches or the die comprises a compound punch or die, with at least two electrically conductive elements separated from one another by an electrical insulator. A compound punch can be constructed from nested parts with cylindrical symmetry, for example. A compound die can be constructed by stacking two or more die pieces, again separated by electrical insulators. The heater consists of at least two heating elements, separated from one another by one or more electrical insulators. The heaters deposit a non-uniform distribution of beat within the cell, via a non-uniform cross section, for example, so that one portion of the cell may be heated more than another by preferentially applying power to one heater relative to the other(s).

Figure 9:
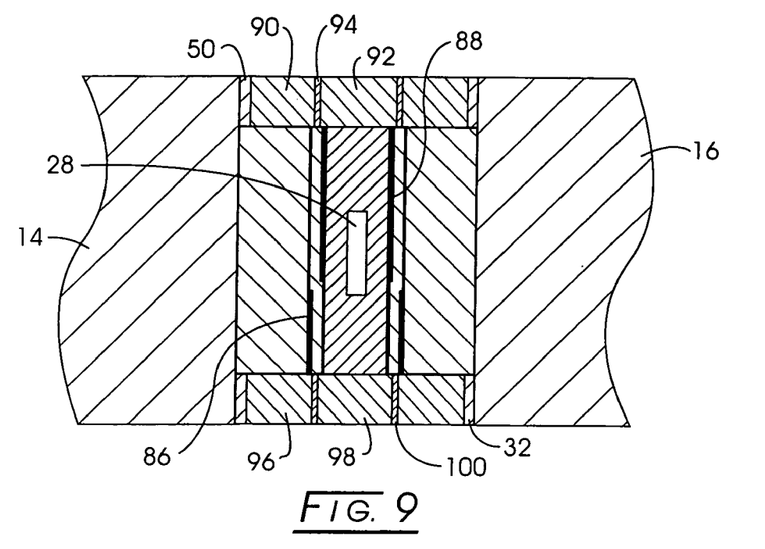
FIG. 9 is a cross-sectional view of one embodiment of a zero-stroke-type apparatus with a compound anvil in the prior art.

In another embodiment of the invention, with a zero-stroke apparatus, is shown in FIG. 9. Rather than a single heating element, the cell contains at least two nested heating elements consisting of an outer heating elements in the form of heater tube, 86, and a nested inner heater tuber, 88. Each tube has a non-uniform cross section so that a greater extent of ohmic heating occurs in some regions of the heater (those with a lesser cross section) than others. The regions of greatest heat dissipation by the two heaters are placed in different positions in the cell, for example, with one heater preferentially heating the top half of the cell (for example, heater tube 86) and the other heater preferentially heating the bottom half of the cell (for example, heater tube 88). In this way, the relative temperatures in different regions of the cell can be controlled by varying the fraction of the total power that is dissipated by the different heaters.

Figure 10:
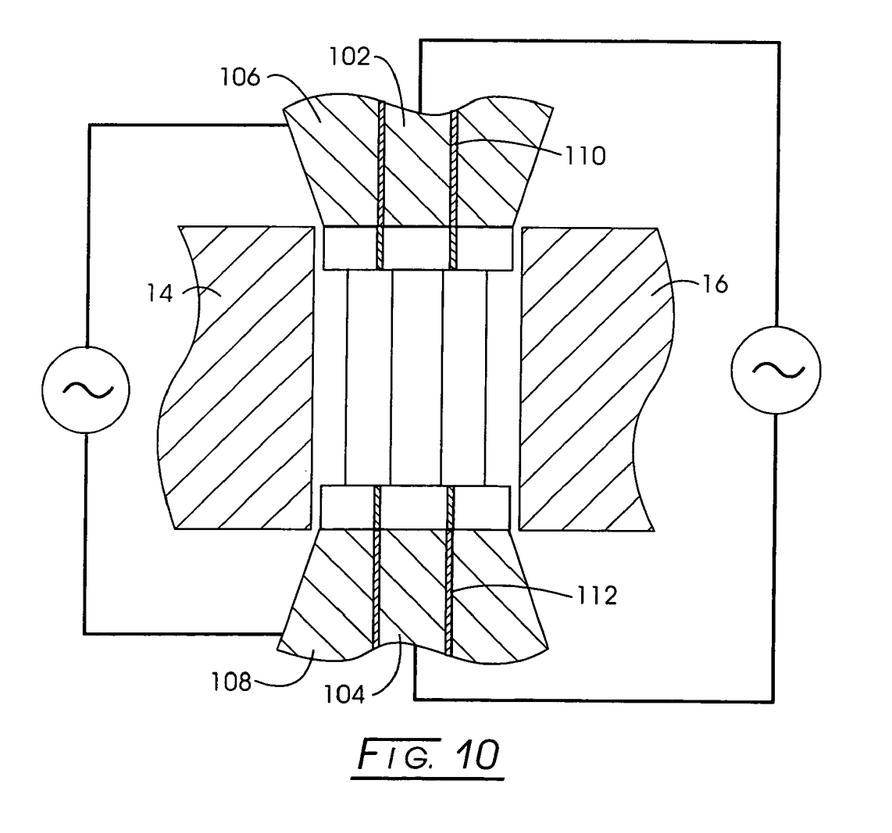
FIG. 10 shows the electrical path for the inventive zero-stroke-type apparatus of FIG. 9 for its heating.

In one embodiment to provide power to the two or more heaters, the end caps of the cell and the upper and lower anvils comprise nested elements, separated by insulators, as shown in FIGS. 9 and 10, e.g., an upper outer endcap, 90, and an upper inner endcap, 92, separated by an insulating ring, 94; and a lower outer endcap, 96, and a lower inner endcap, 98, separated in an insulating ring, 100. Separate circuits provide electrical power to the inner and outer heaters via inner anvil elements, 102 and 104, and outer anvil elements, 106 and 108, respectively, which are separated by electrical insulators, 110 and 112, respectively, such as shown in FIG. 10. Optionally, one of insulators 110 or 112 can be omitted so that the two circuits share one of the anvils as an electrical common.

Figure 11:
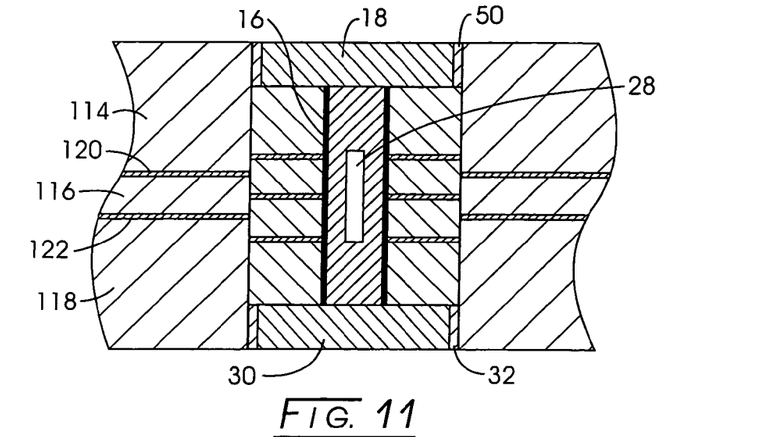
FIG. 11 is a cross-sectional view of another zero-stroke-type apparatus with a compound die.
Figure 12:
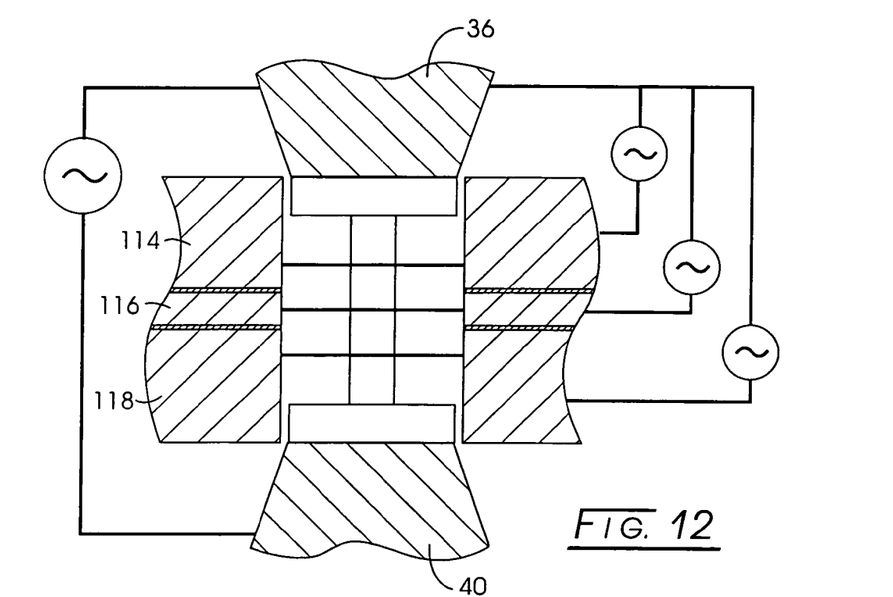
FIG. 12 shows the electrical path for the inventive zero-stroke-type apparatus of FIG. 11 for its heating.
Figure 13:
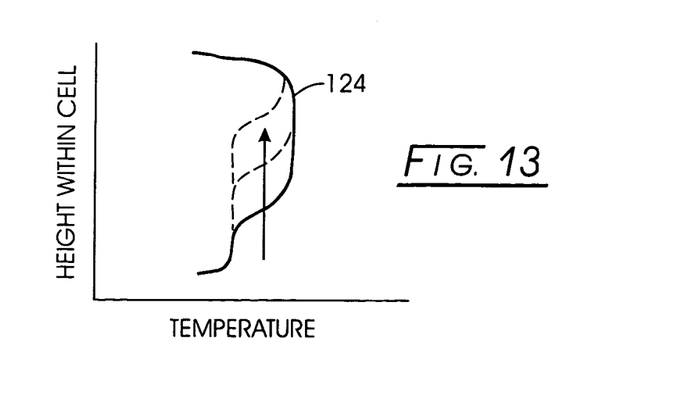
FIG. 13 shows a series of temperature profiles achievable with the inventive compound-die apparatus of FIG. 11.

In yet another embodiment, also with a zero-stroke apparatus, is shown in FIG. 11. The die comprises a compound die, with at least two stacked disks or die segments, separated by insulators. At least two annuli provide electrical contact between two or more intermediate positions of the heater with the die segments. As shown in FIG. 11, die segments, 114, 116, and 118, are separated by electrical insulators, 120 and 122. The main heater power is applied between anvils 36 and 40, and differential heater power is applied between one of anvils 36 or 40 and each die segment as shown in FIG. 12. This embodiment has the advantage of being able to provide a finer degree of control of the temperature distribution in the sample, which is particularly useful for growth of a crystal from its melt or from a flux, for example. The wattages to the various segments of the heater may be adjusted to provide a relatively sharp temperature gradient near the bottom of the sample, as shown by a solid curve, 124, in FIG. 13, as would be suitable for forming a crystal at the lower temperature. Then, as the run proceeds, the wattages are adjusted so as to cause the position of the temperature gradient to propagate upward (as indicated by the dashed lines) while keeping the values of the lower and upper temperatures approximately the same, as indicated by the arrow in FIG. 13. In this way the position of the crystallization zone can be propagated upward to form a larger portion of the sample into a single crystal.

It should be understood that electrical connections can be made by use of, for example, electrically-conductive inserts or the like, e.g., inserts 72 and 74 in FIG. 5, along with suitable electrical leads therefrom for connection with the power source(s). Such electrical connections are to be provided where necessary, desirable, or convenient in series and/or parallel fashion in order to implement the precepts of the present invention, as those skilled in the art will be aware.

HPHT Apparatus with Controlled Cooling Means: In another embodiment of the invention, differential temperature control is achieved by means of independent control of the temperature of the coolant used to cool components of the pressure vessel, for example, opposing anvils or an anvil and a die.

The differential cooling provides different, and controllable, boundary conditions for different sides of the cell, and therefore allows the temperatures of at least two different locations in the cell to be independently controlled. This embodiment may be used in conjunction with a belt press, a zero-stroke press, a piston-cylinder press, a multi-anvil press, a toroid-type press, or a split-sphere press, as described above.

In one embodiment of the invention wherein differential cooling is used to control the temperature mean and temperature gradient, only a single heating path, with a single electrical power supply, is required for a more limited range of temperature gradients. In this embodiment, the time constant for temperature control by control of the coolant temperature may be much larger than that of the embodiment having multiple heating paths, as the temperature of a pressure component (e.g. an anvil), which has a substantial heat capacity, must change before the temperature of the boundary of the cell will change.

Applications of the HP/HT Apparatus of the Invention. The novel pressure vessel/HP/HT apparatus may be used to form single crystals of materials such as, but not limited to diamond, nitrides including nitrides of monocrystalline group III–V, II–VI compounds, and the like.

To form such single crystals, at least one source material, e.g., one or more GaN seed crystals, GaN source material, and a solvent that becomes a supercritical fluid under HP/HT conditions, for example, ammonia, are sealed within the self-pressuring capsule. The capsule is then subjected to HP/HT conditions using the HP/HT apparatus of the invention, under which conditions the solvent becomes a super-critical fluid, which then reacts with at least with one of the materials to form single crystals.

In one embodiment of an HP/HT operation, the capsule is first heated to the growth temperature, e.g., between about 500° C. and 1500° C. in one embodiment and 550° C. to 1200° C. in another embodiment, at an average rate between about 1° C./hr and 1000° C./hr. The apparatus of the invention allows the temperature gradient to be controlled, i.e., to less than about 25° C., in one embodiment to less than 15° C., and in still another embodiment to less than about 10° C., for a period between about 1 minute and 2 hours, in order to allow the system to equilibrate in an equilibrium stage. Temperature gradients have the effect of creating a supersaturation throughout the heating sequence and thus promoting spontaneous nucleation. A temperature gradient greater than 25° C. is desirable for obtaining a high growth rate after equilibration has been established. As explained above, the temperature gradient is the difference in the temperature at the ends of the capsule, for example, where the temperature sensors are located. The temperature gradient at the position of the seed crystal or nucleation center with respect to the temperature at the position of the source material is likely to be somewhat smaller.

After this equilibration period, a growth period may be provided where the temperature gradient is increased in magnitude and has a sign such that growth occurs at the seed crystal at a greater rate. For example the temperature gradient may be increased at a rate between about 0.01° C./hr and 25° C./hr, to a larger value where growth is faster. During the crystal growth, the temperature gradient may be held at a magnitude of between 5° C. and 300° C. and may be adjusted upward or downward during growth. In another embodiment, the temperature gradient may be changed to have a sign opposite to the sign where growth occurs at the seed crystal. The sign of the gradient may be reversed one or more additional times in order to alternately etch away any spontaneously-formed nuclei and promote growth on one or more nucleation centers or seed crystals.

At the conclusion of the growth period, the temperature of the capsule may be ramped down at a rate between about 1° C./hr and 1000° C./hr, e.g., between about 1° C./hr and 300° C./hr so as to minimize thermal shock to the grown crystal. The cell, including the capsule and pressure medium, is removed from the pressure vessel and the capsule is removed from the cell.

In operation, it is found that the apparatus of the present invention, with features allowing for independent control of both the mean temperature in the cell and the temperature gradient across the cell, produce monocrystalline group III–V, II–VI compounds that have reduced crystal defect density, improved crystal growth yield, and improved bulk material characteristics. In one embodiment, the apparatus of the invention allows yields large single gallium nitride crystals, for example, single gallium nitride crystals having a diameter and thickness in a range from about 0.02 inch (about 0.05 cm) to about 12 inches (about 30 cm), for example a size in a range from about 2 inches to about 6 inches. In another embodiment, the crystals formed are substantially free of tilt boundaries and have a dislocation density of less than $10^4$ $cm^{-2}$, a photoluminescence spectrum which peaks at a photon energy of about 3.38 and about 3.41 eV at a crystal temperature of about 300°K, an optical absorption coefficient of about below 5 $cm^{-1}$ for wavelengths between 700 nm (red) and 465 nm (blue), an infrared absorption peak at about 3175 $cm^{-1}$ with an absorbance per unit thickness greater than about 0.01 $cm^{-1}$, and a fluorine concentration greater than about 0.04 ppm.

The crystals grown may be sliced into one or more wafers by methods that are well known in the art. The GaN crystal or wafer is useful as a substrate for epitaxial $Al_xIn_yGa_{1-x-y}N$ films where $0 \leq x \leq 1$, $0 \leq y \leq 1$ and $0 \leq x+y \leq 1$, light emitting diodes, laser diodes, photodetectors, avalanche photodiodes, transistors, diodes, and other optoelectronic and electronic devices.

EXAMPLES

Examples are provided herein to illustrate the invention but are not intended to limit the scope of the invention.

Example 1

Prior Art Cell

A 0.5-inch-diameter silver capsule is filled with polycrystalline gallium nitride (three seeds, weighing 3–4 mg each), ammonium fluoride, and ammonia, and sealed, as described in U.S. patent application Publication No. 2003/0141301. The sealed capsule is placed in a cell in a zero-stroke HP/HT apparatus, as described in described in U.S. patent application Publication No. 2003/0140845 and also illustrated in FIGS. 1 and 2.

At the bottom of the cell, the capsule is separated from a steel endcap by a sodium chloride plug, 0.934" in height. At the top of the cell, the capsule is separated from a steel endcap by a sodium chloride plug, 0.624" in height. The endcaps are cooled by thermal conduction to water-cooled anvils and, therefore, the top end of the capsule is cooler than the bottom end of the capsule during HP/HT operation, because of a thinner sodium chloride insulating layer.

The capsule is heated from room temperature to about 750° C. by passing electrical current though a graphite tube heater that surrounded the capsule. The temperature of the top of the capsule is cooler than that of the bottom of the capsule throughout the run, by an extent that is approximately proportional to the difference between the average capsule temperature and room temperature.

The magnitude of the temperature gradient at an average capsule temperature of 750° C. may be adjusted by changing the relative thickness of the insulating sodium chloride layers above and below the capsule, but the relative gradient cannot be adjusted to any significant extent independently of the average temperature while the run was underway.

Figure 14:
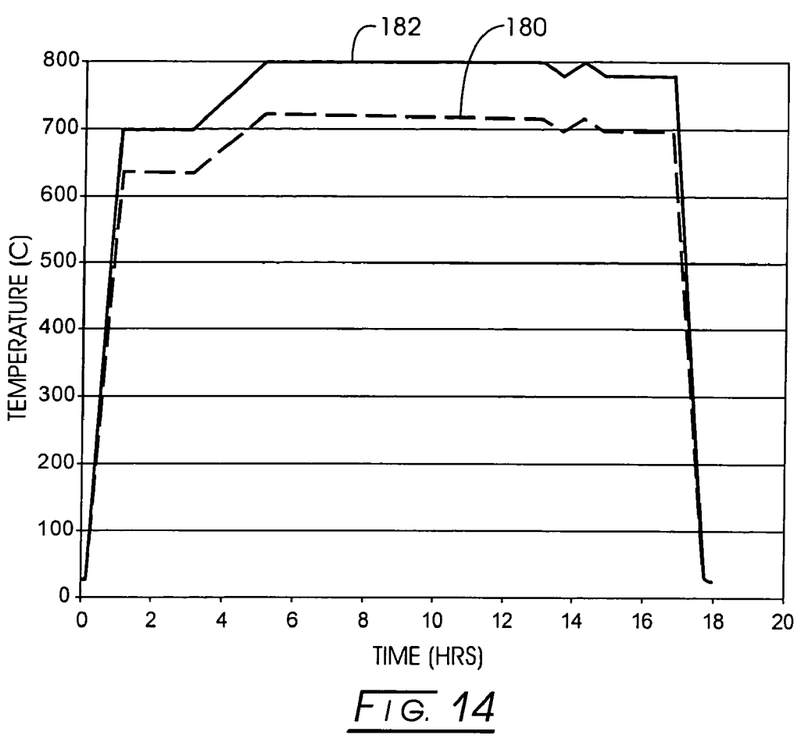
FIG. 14 graphically plots the temperature profile for a prior art zero-stroke-type apparatus, as described in Example 1.

The temperature profile of this cell can be seen in FIG. 14, wherein line 180 is the temperature profile for the top of capsule 28 and line 182 is the temperature profile for the bottom of capsule 28. Both temperatures are measured using chromelalumel (type K) thermocouples, uncorrected for pressure. It will be observed that the difference around hour 2 is about 65° C., and about 80° C. during about hours 6 through 12.

Upon opening the capsule after venting of the ammonia, numerous spontaneously-nucleated crystals are observed at the bottom of the capsule with the largest crystal having a size of 0.5 mm in diameter.

Example 2

Inventive Apparatus of the Invention

A silver capsule is filled with polycrystalline gallium nitride, a seed crystal, ammonium fluoride, and ammonia and placed in a cell as in Example 1. However, in addition to having a graphite heating element running from the top to the bottom of the cell, an annular graphite disk is located at the vertical midpoint of the cell, contacting the heating element at its inner diameter and the die wall on its outer diameter, as shown in FIG. 3.

Figure 15:
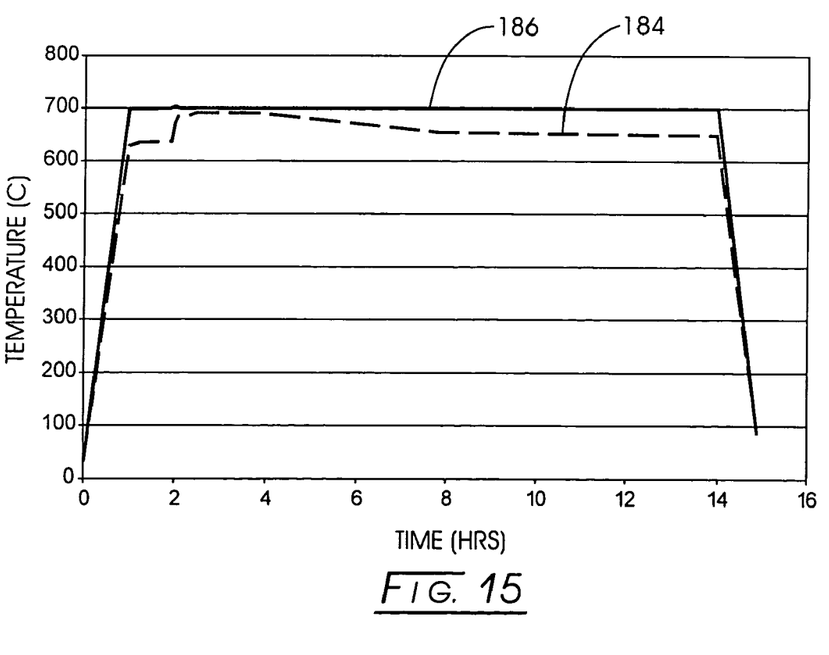
FIG. 15 graphically plots the temperature profile for one embodiment of the invention, the zero-stroke-type apparatus of as described in Example 2.

The capsule is heated from room temperature to about 700° C., as shown in FIG. 15, by passing electrical current though the graphite tube heater. The temperature of the top of the capsule is cooler than that of the bottom of the capsule, as in Example 1, by an extent that is approximately proportional to the difference between the average capsule temperature and room temperature.

As soon as the bottom temperature reached 700° C., electrical current is flowed through the secondary circuit between the top anvil and the die, differentially heating the top half of the capsule. The current to the central heater is reduced, by means of closed-loop temperature control, so that the temperature of the bottom half of the capsule remains constant while the temperature of the top of the capsule increases to 700° C. Once the temperature of the top of the capsule reaches 700° C., it is held constant so that there is no supersaturation in the capsule and the cell can reach equilibrium without undesirable nucleation or crystal growth taking place. After 60 minutes, the temperature of the top of the capsule is ramped to 650° C. at a controlled rate of 0.17° C./min, generating a controlled supersaturation at a controlled rate, then held constant again.

Upon opening the capsule after venting of the ammonia, the seed has grown to a weight of approximately 40 mg. The crystal is then etched in 50% $HNO_3$ for 30 min. A row of etch pits is observed on the o-face above the interface between the seed and new, laterally-grown material. However, the remaining areas of newly-grown GaN were free of etch pits. The area of pit-free newly grown GaN is approximately $6.9 \times 10^{-2}$ $cm^2$, indicating that the etch pit density is less than $(1/6.9 \times 10^{-2}$ $cm^2)$ or 14 $cm^{-2}$.

In FIG. 15, line 184 represents the temperature profile for the top of capsule 28, while line 186 represents the temperature profile for the bottom of capsule 28. The same thermocouples are used as in Example 1.

It will be observed that the temperature difference initially around hour 1 is about 68° C. During the soak between about hours 2 and 14, the minimum temperature difference between the top and bottom of capsule 28 is about 7° C. and the maximum temperature difference was about 49° C.

The profile shown in FIG. 15 as a function of height within the reactor cell is quite useful for crystal growth. As shown, the top and bottom capsule temperature differences are dramatically smaller, and controllable, compared to the temperature differences reported in Example 1.

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

We claim:

1. A high temperature/high pressure (HP/HT) apparatus, which comprises:
   (a) a pressure vessel comprising a cell for growing crystals or processing material in a liquid or solid pressure transmitting medium;
   (b) at least a heating element for heating said cell;
   (c) at least an electrical power system for powering said heating element;
   (d) at least two different heating paths between said heating element and said electrical power system;
   (e) at least three electrical connections for connecting the electrical power system to the at least two different heating paths;
   (f) at least an electrical insulator disposed within said pressure vessel for establishing the at least two different electrical heating paths, for independently controlling the temperatures of at least two locations in the cell.

2. A high temperature/high pressure (HP/HT) apparatus for growing crystals or processing material in a liquid or solid pressure transmitting medium in a cell, wherein the temperature difference between two locations within the cell may be adjusted to a minimum below 15° C. and a maximum greater than 25° C. while the cell is being heated to a growth temperature of between 500° C. and 1300° C.

3. A gallium nitride single crystal grown in the HP/HT apparatus of claim 1, wherein said gallium nitride single crystal has a dislocation density of less than $10^4$ per $cm^2$ and at least one of a diameter and a thickness of greater than 0.05 cm.

4. The HP/HT apparatus of claim 1, wherein the cell comprises at least a temperature sensor for measuring the temperature of at least a location in the cell, and wherein the temperature sensor is selected from one of a thermocouple, a thermistor, an optical fiber coupled to an optical pyrometer, or any combination thereof.

5. The HP/HT apparatus of claim 1, wherein
said cell comprises a lateral confining die and at least an upper and lower pressure anvils,
the heating element comprises a cylindrical heating element having at least one end in electrical contact with at least one of the anvils;
at least one of the anvils or die is in electrical contact with a central portion of the heating element.

6. The HP/HT apparatus of claim 1, wherein
said apparatus further comprises nested elements within said at least one anvil, with an electrical insulator separating the nested anvil elements;
said cell is defined by a lateral confining die and at least an upper and lower pressure anvils, at least one of which comprises a nested anvil element;
the heating element comprises at least two nested cylindrical heating elements each having at least two ends, and wherein at least one of said elements has a non-uniform cross section;
the first end of each cylindrical heating element being in electrical contact with at least one of the anvils or the nested anvil elements, and the second end of each of the cylindrical heating elements being in separate electrical contact with a different anvil or nested anvil element.

7. The HP/HT apparatus of claim 1, wherein
said apparatus further comprises an upper and a lower pressure anvil;
said cell is defined by at least two lateral confining dies having at least two components electrically separated from one another by at least one insulator,
at least a portion of the heating element is in electrical contact with at least one of the dies and at least another portion of the heating element is in electrical contact with at least one of said anvils.

8. The HP/HT apparatus of claim 1, wherein the pressure vessel is selected from one of a belt apparatus, a zero-stroke apparatus, a piston-cylinder apparatus, a multi-anvil press, a split-sphere apparatus, and a toroid apparatus.

9. The HP/HT apparatus of claim 7, wherein the pressure vessel comprises a toroid apparatus having upper and lower recessed anvils in electrical contact with opposite ends of the heating element, and with at least one disk element between the recessed anvils in electrical contact with at least one portion of the heating element, and further comprises insulators separating the disk elements from one another and from the upper and lower anvils.

10. The HP/HT apparatus of claim 1, wherein the heating element is formed from at least one of graphite foil, graphite, a Ni (60%)/Fe (25%)/Cr (15%) alloy, niobium, titanium, tantalum, stainless steel, nickel, chromium, zirconium, molybdenum, tungsten, rhenium, hafnium, platinum, silicon carbide, and combinations thereof.

11. The HP/HT apparatus of claim 1, wherein the pressure transmission medium comprises one or more of alkali metal halide, talc, pyrophyllite, molybdenum disulfide, graphite, hexagonal boron nitride, silver chloride, calcium fluoride, strontium fluoride, calcium carbonate, magnesium oxide, zirconium oxide, merylinite clay, bentonite clay, sodium silicate, and combinations thereof.

12. The improved HP/HT apparatus of claim 1, which is capable of growing crystals at pressures ranging from between about 2 kbar and about 100 kbar.

13. The HP/HT apparatus of claim 1, wherein said heating element is selected from at least one of a heating tube, a heated foil, a ribbon, a bar, a wire, a ring, or combinations thereof.

14. A method for treating a sample in a liquid or solid pressure transmitting medium using a high temperature/high pressure (HP/HT) apparatus, which method comprises the steps of:
   placing the sample in the HP/HT apparatus which comprises a pressure vessel having a cell disposed in said pressure vessel, a heating element for heating said cell, an electrical power system for powering said heating element; at least two different heating paths between said heating element and said electrical power system; at least three electrical connections for connecting the electrical power system to the at least two different heating paths; and at least an electrical insulator disposed within said pressure vessel for establishing the at least two different electrical heating paths, for independently controlling the temperatures of at least two locations in the cell;
   processing of said sample by subjecting said sample to conditions of high pressure and high temperature, wherein the temperature is independently controlled for at least two different locations within the cell.

15. The method of claim 14, wherein the cell comprises at least a temperature sensor for measuring the temperature of at least a location in the cell and wherein the temperature sensor is selected from one of a thermocouple, a thermistor, an optical fiber coupled to an optical pyrometer, or any combination thereof.

16. The method of claim 14, wherein
   said cell is defined by a lateral confining die and at least an upper and lower pressure anvils,
   the heating element comprises a cylindrical heating element having at least one end in electrical contact with at least one of the anvils;
   at least one of the anvils or die is in electrical contact with a central portion of the heating element.

17. The method of claim 14, wherein
   said apparatus further comprises nested elements within said at least one anvil, with an electrical insulator separating the nested anvil elements;
   said cell is defined by a lateral confining die and at least an upper and lower pressure anvils, at least one of which comprises a nested anvil element;
   the heating element comprises at least two nested cylindrical heating elements each having at least two ends, and wherein at least one of said elements has a non-uniform cross section;
   the first end of each cylindrical heating element being in electrical contact with at least one of the anvils or the nested anvil elements, and the second end of each of the cylindrical heating elements being in separate electrical contact with a different anvil or nested anvil element.

18. The method of claim 14, wherein
   said HP/HT apparatus further comprises an upper and a lower pressure anvils;
   said cell is defined by at least two lateral confining dies having at least two components electrically separated from one another by at least one insulator,
   at least a portion of the heating element is in electrical contact with at least one of the dies and at least another portion of the heating element is in electrical contact with at least one of said anvils.

19. The method of claim 14, wherein the pressure vessel is selected from one of a belt apparatus, a zero-stroke apparatus, a piston-cylinder apparatus, a multi-anvil press, a split-sphere apparatus, and a toroid apparatus.

20. The method of claim 19, wherein the pressure vessel comprises a toroid apparatus having upper and lower recessed anvils in electrical contact with opposite ends of the heating element, and with at least one disk element between the recessed anvils in electrical contact with at least one additional portion of the heating element, and with insulators separating the disk elements from one another and from the upper and lower anvils.

21. The method of claim 14, wherein the heating element is formed from one or more of graphite, a Ni (60%)/Fe (25%)/Cr (15%) alloy, niobium, titanium, tantalum, stainless steel, nickel, chromium, zirconium, molybdenum, tungsten, rhenium, hafnium, platinum, or silicon carbide.

22. The method of claim 14, wherein the pressure transmission medium comprises one or more of alkali metal halide, talc, pyrophyllite, molybdenum disulfide, graphite, hexagonal boron nitride, silver chloride, calcium fluoride, strontium fluoride, calcium carbonate, magnesium oxide, zirconium oxide, merylinite clay, bentonite clay, or sodium silicate.

23. The method of claim 14, wherein said processing comprises growing crystals from said sample at pressures ranging from between about 2 kbar and about 100 kbar.

24. The method of claim 18, wherein said heating element is selected from at least one of a heating tube, a heated foil, a ribbon, a bar, a wire, a ring, or combinations thereof.

25. A high temperature/high pressure (HP/HT) apparatus, which comprises:
   (a) a pressure vessel comprising a cell for growing crystals or processing material in a liquid or solid pressure transmitting medium;
   (b) at least a heating element for healing said cell;
   (c) at least an electrical power system for powering said heating element;
   (d) at least a coolant for cooling components of the pressure vessel;
   (e) at least a cooling circuit disposed within said pressure vessel for independently controlling the temperatures of at least two locations in the cell.

26. The HP/HT apparatus of claim 25, wherein
   said cell is defined by a lateral confining die and at least an upper anvil and a lower pressure anvil;
   wherein said cooling circuit is associated with said lateral confining die and at least one anvil.

27. A gallium nitride crystals grown by the method of claim 14, wherein said crystal has a dislocation density of less than $10^4$ per $cm^2$ and at least one of a diameter and a thickness of greater than 0.05 cm.

* * * * *